United States Patent [19]
Wood

[11] Patent Number: 5,286,133
[45] Date of Patent: Feb. 15, 1994

[54] JOINT FOR VEHICLE STEERING LINKAGE

[75] Inventor: Ruey E. Wood, Harrison, Mich.

[73] Assignee: TRW Inc., Lyndhurst, Ohio

[21] Appl. No.: 745,523

[22] Filed: Aug. 15, 1991

[51] Int. Cl.$^5$ ............................ F16B 2/06; F16B 7/04; F16B 7/18; F16D 1/12

[52] U.S. Cl. ................................. 403/290; 403/77; 403/320; 403/343; 403/370

[58] Field of Search ............... 403/46, 342, 343, 320, 403/371, 141, 240, 77

[56] References Cited

U.S. PATENT DOCUMENTS

| | | | |
|---|---|---|---|
| 1,016,835 | 2/1912 | Levy-Maurice et al. | |
| 1,418,298 | 6/1922 | Gorman | 403/46 |
| 1,421,866 | 7/1922 | Veeder | |
| 2,451,062 | 10/1948 | Booth | 403/290 |
| 2,696,367 | 12/1954 | Booth | |
| 2,703,723 | 3/1955 | Hess | |
| 2,885,234 | 5/1959 | Larson | |
| 3,349,662 | 10/1967 | Williams | |
| 3,498,652 | 3/1970 | Cass | |
| 3,801,207 | 4/1974 | Herbenar et al. | 403/46 |
| 4,172,676 | 10/1979 | De Chant | 403/43 |
| 4,657,424 | 4/1987 | Dong | 403/46 |
| 5,004,367 | 4/1991 | Wood, Jr. | 403/46 |

FOREIGN PATENT DOCUMENTS

| | | |
|---|---|---|
| 86022660 | 4/1986 | Fed. Rep. of Germany . |
| 295718 | 4/1992 | Italy . |
| 343297 | 1/1931 | United Kingdom . |
| 1290109 | 9/1972 | United Kingdom ............... 403/46 |

Primary Examiner—Eric K. Nicholson
Assistant Examiner—Christopher J. Novasad
Attorney, Agent, or Firm—Tarolli, Sundheim & Covell

[57] ABSTRACT

A joint for a vehicle steering linkage comprises a housing and a ball stud. The housing has a socket which contains the ball end of the ball stud, and has a sleeve which receives the end of a tie rod. The sleeve has an external, first clamping surface which is inclined with respect to the axis of the sleeve. The joint further comprises a clamp which clamps the tie rod in the sleeve. The clamp includes a clamping member and a threaded nut. The clamping member has a second clamping surface, and is free of a thread for engaging the thread on the tie rod. The threaded nut moves the clamping member relative to the sleeve and the tie rod, and moves the second clamping surface in sliding contact with the first clamping surface.

10 Claims, 2 Drawing Sheets

5,286,133

JOINT FOR VEHICLE STEERING LINKAGE

FIELD OF THE INVENTION

The present invention relates to a joint for a vehicle steering linkage.

BACKGROUND OF THE INVENTION

U.S. Pat. No. 5,004,367 (the '367 patent) discloses a joint in a vehicle steering linkage. The joint disclosed in the '367 patent comprises an internally threaded sleeve in which a threaded rod extends. The sleeve is made from a metal blank which is formed into a tubular shape, and has a longitudinal seam which is defined by adjoining edges of the metal blank. The sleeve also has a frusto-conical outer surface extending circumferentially around the sleeve.

The joint disclosed in the '367 patent further comprises a nut having an internal thread engaged with the thread on the rod. The nut has a frusto-conical inner surface complementary to the frusto-conical outer surface on the sleeve.

When the nut is moved axially on the rod toward the sleeve, the frusto-conical inner surface on the nut is moved into sliding contact with the frusto-conical outer surface on the sleeve. When the nut is tightened axially against the sleeve, a force is developed between the frusto-conical surfaces, and the sleeve is pressed against the rod to clamp the rod in the sleeve.

SUMMARY OF THE INVENTION

In accordance with the present invention, a joint connects a threaded rod in a vehicle steering linkage with another member in the vehicle steering linkage. The joint comprises a housing and a ball stud. The housing includes a socket and a sleeve extending from the socket along an axis. The sleeve has an opening for insertion of the rod, and has an internal thread engageable with the thread on the rod. The sleeve also has an external, first clamping surface inclined with respect to the axis. The ball stud has a ball end and a shank. The ball end is located in the socket, and the shank has means for connecting the ball stud to the other member in the vehicle steering linkage.

The joint further comprises a clamping means which develops a clamping force between the internal thread on the sleeve and the thread on the rod. The clamping means includes a clamping member and a thread means. The clamping member has a second clamping surface, and is free of a thread for engaging the thread on the rod. The thread means moves the clamping member relative to the sleeve and the rod, and moves the second clamping surface in sliding contact with the first clamping surface. The pressure exerted against the first clamping surface by the second clamping surface is transmitted to the engaged threads on the sleeve and the rod. The clamping means thus clamps the rod in the sleeve.

In a preferred embodiment of the invention, the clamping member is an unthreaded ring receivable axially over the end of the sleeve. The first clamping surface on the sleeve is a frusto-conical external surface extending circumferentially around the sleeve, and the second clamping surface on the clamping member is a frusto-conical internal surface extending circumferentially around the inside of the clamping member. The thread means comprises an internal thread on a nut which is threaded on the rod. The nut pushes the clamping member onto the sleeve when the nut is moved on the rod axially toward the sleeve.

In another preferred embodiment of the invention, the sleeve has an external thread, and the clamping member has an internal thread engaged with the external thread on the sleeve. The second clamping surface on the clamping member is movable against the first clamping surface on the sleeve upon rotation of the clamping member about the sleeve. Preferably, the external thread on the sleeve is a tapered thread on the first clamping surface, and the internal thread on the clamping member is a tapered thread on the second clamping surface.

BRIEF DESCRIPTION OF THE DRAWINGS

The foregoing and other features of the invention will become apparent to those skilled in the art upon reading the following description of preferred embodiments of the invention in view of the accompanying drawings, wherein.

DESCRIPTION OF PREFERRED EMBODIMENTS

Figure 1:
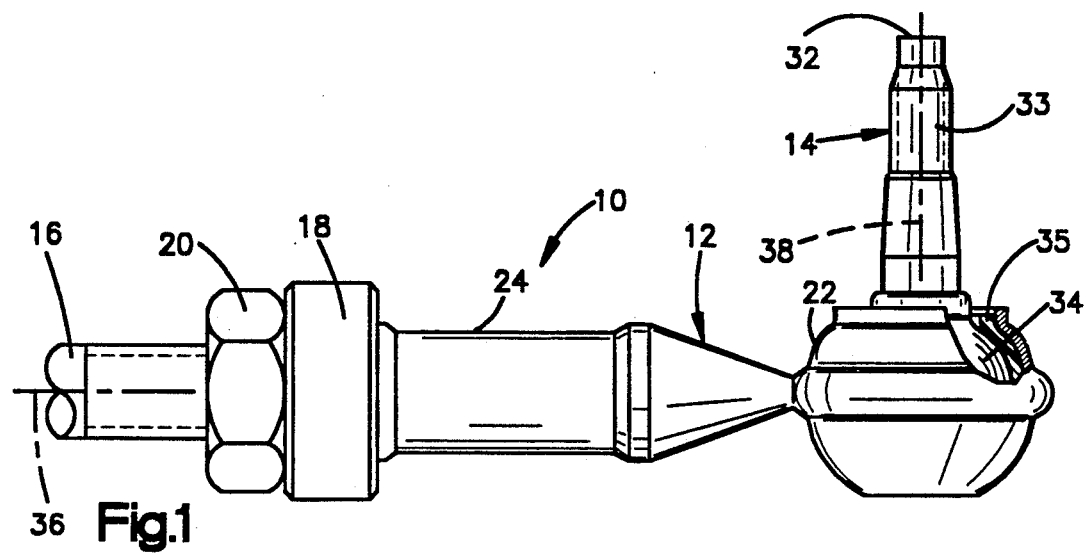
FIG. 1 is a side view of a joint constructed in accordance with the invention.

As shown in FIG. 1, a joint 10 constructed in accordance with a preferred embodiment of the present invention comprises a housing 12 and a ball stud 14. A tie rod 16 is clamped securely in the housing 12 by a clamping member 18 and a nut 20.

Figure 1A:
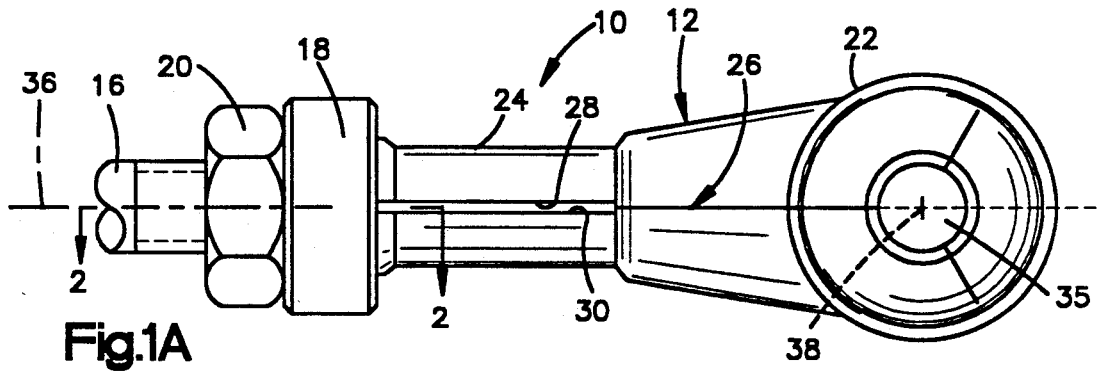
FIG. 1A is a bottom view of the joint of FIG. 1.

The housing 12 is formed from a metal blank which is shaped in a stamping process. The housing 12 has a first end portion including a socket 22, and has a second end portion including a sleeve 24. As shown in FIG. 1A, the housing 12 also has a longitudinally extending seam 26 which is defined by adjoining edge surfaces 28 and 30 of the metal blank from which the housing 12 is formed. The seam 26 enables the sleeve 24 to flex slightly with movement of the edge surfaces 28 and 30 relative to each other.

The housing 12 is preferably formed of SAE grade 950 steel supplied by Worthington Steel Co. with the trademark "Maxi-form 50". The housing 12 can alternately be formed of any SAE/ASTM grade of stamping material suitable to meet the strength, ductility and formability requirements of the process and the final product application. Additionally, the housing 12 can be formed and assembled in accordance with the invention set forth in co-pending patent application Ser. No. 652,434 filed Feb. 8, 1991, entitled "Ball Joint and Method of Assembly", now U.S. Pat. No. 5,061,110.

The ball stud 14 has a shank 32 with a thread 33 for connecting the ball stud 14 to another member (not shown) in the vehicle steering linkage, such as a steering arm. The ball stud 14 also has a ball end 34 encapsulated in a bearing 35 in the socket 22. The bearing 35 supports the ball stud 14 for limited pivotal movement about horizontal and vertical axes 36 and 38. The ball stud 14 is preferably formed of SAE 8115, 8615, 8640 or similar grade steel which is cold-formed or machined, carburized or carbonitrided to a 20-30 Rc core hardness and a 0.006-0.015 inch case depth, and may be supplied by Republic Steel Corp. The bearing 35 is preferably formed of an elastomeric material, and is most preferably formed of natural rubber (poly-isoprene) which is Banbury mixed and insert molded by injection and/or compression molding, and supplied by Yale-South Haven Inc. of South Haven, Mich. The ball stud 14 and the bearing 35 also can be formed and assembled as disclosed in co-pending patent application Ser. No. 652,434, now U.S. Pat. No. 5,061,110.

Figure 2:
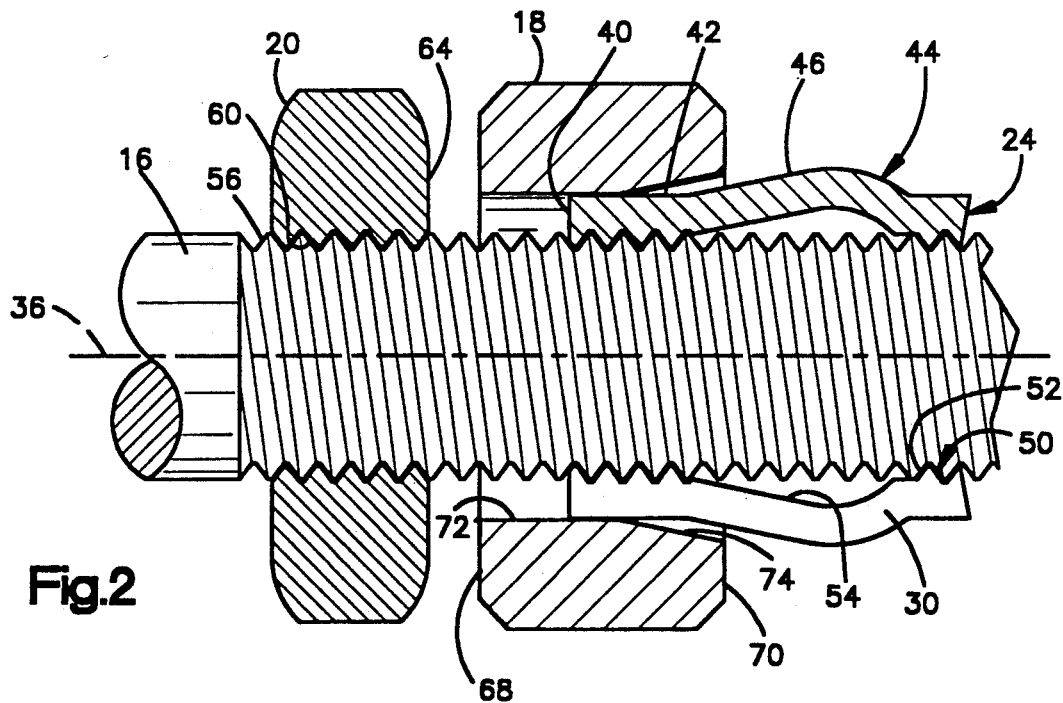
FIG. 2 is a sectional view taken on line 2—2 of FIG. 1A.

As shown in FIG. 2, the sleeve 24 has an annular end surface 40, a cylindrical outer surface 42, and an enlarged clamping portion 44 which is spaced axially from the end surface 40 by the cylindrical outer surface 42. The clamping portion 44 includes a first clamping surface 46. The first clamping surface 46 is a frusto-conical outer surface of the sleeve 24 extending circumferentially around the sleeve 24 from one edge surface 28 to the other edge surface 30. The first clamping surface 46 is thus inclined with respect to the horizontal axis 36 of the sleeve 24. The sleeve 24 also has an inner surface 50 with an internal thread 52. The internal thread 52 is interrupted by an unthreaded region 54 of the inner surface 50 which is deformed radially outward upon formation of the enlarged clamping portion 44 of the sleeve 24.

The tie rod 16 has a circumferential screw thread 56 engaged with the internal thread 52 in the sleeve 24, and is thus movable axially and rotationally relative to the sleeve 24 upon rotation of the tie rod 16 in the sleeve 24. The tie rod 16 is preferably formed of SAE 8115 steel, and may be supplied by Republic Steel Corp.

The nut 20 has an internal thread 60 engaged with the thread 56 on the tie rod 16. The nut 20 is thus movable axially and rotationally relative to the tie rod 16 and the sleeve 24 upon rotation of the nut 20 on the tie rod 16. The nut 20 also has an annular end surface 64 facing the annular end surface 40 on the sleeve 24. Preferably, the nut 20 is formed of SAE 1033 steel, and may be supplied by R.B.& W. Manufacturing.

The clamping member 18 is received axially over the sleeve 24, and is rotatable relative to the sleeve 24, the tie rod 16 and the nut 20. The clamping member 18 has a first annular end surface 68 defining a first open end of the clamping member 18, and has a second annular end surface 70 defining a second open end of the clamping member 18. A cylindrical inner surface 72 of the clamping member 18 extends axially from the first open end, and is receivable coaxially over the cylindrical outer surface 42 of the sleeve 24. A second clamping surface 74 extends axially from the second open end of the clamping member 18 to the cylindrical inner surface 72. The second clamping surface 74 is a frusto-conical inner surface extending circumferentially around the inside of the clamping member 18, and has a contour complementary to the contour of the first clamping surface 46 on the sleeve 24. The clamping member 18 is also preferably formed of SAE 1033 steel, and may be supplied by R.B.& W. Manufacturing.

Figure 3:
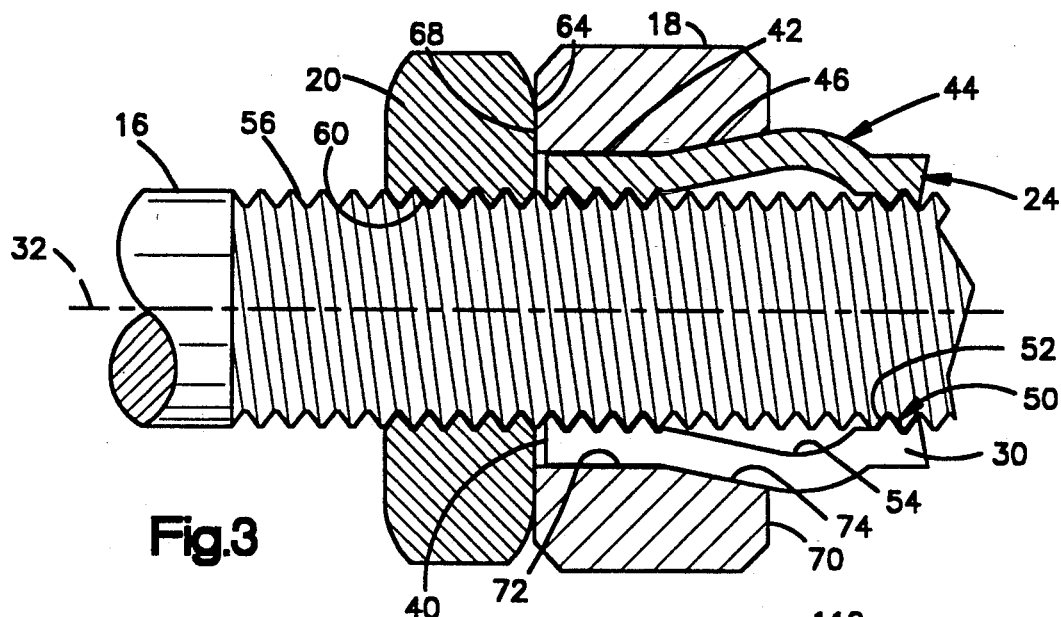
FIG. 3 is a view of the joint of FIG. 2, showing parts in different positions.

When the tie rod 16 is to be clamped in the sleeve 24, the nut 20 and the clamping member 18 are moved from the positions shown in FIG. 2 to the positions shown in FIG. 3. The nut 20 is moved axially on the tie rod 16 toward the sleeve 24, and contacts and pushes the clamping member 18 axially onto the sleeve 24. When the nut 20 is pushing the clamping member 18 axially onto the sleeve 24, the annular end surface 64 on the nut 20 rotates in sliding contact with the first annular end surface 68 on the clamping member 18. Friction between those surfaces may cause the clamping member 18 to rotate about the sleeve 24 as it moves axially onto the sleeve 24.

A clamping force begins to develop between the first clamping surface 46 on the sleeve 24 and the second clamping surface 74 on the clamping member 18 and when the second clamping surface 74 is moved into contact with the first clamping surface 46. The clamping force increases as the clamping member 18 is pushed by the nut 20 so as to advance axially onto the clamping portion 44 of the sleeve 24. The clamping force moves the edge surfaces 28 and 30 of the sleeve 24 toward each other. The sleeve 24 is thus flexed and clamped against the tie rod 16.

In accordance with the invention, the clamping member 18 is not threaded on the tie rod 16 and is not constrained to rotate with the nut 20. The clamping member 18 can therefore move axially over the clamping portion 44 of the sleeve 24 without necessarily rotating about the sleeve 24. The clamping member 18 moves onto the sleeve 24 more easily than it would if the second clamping surface 74 were constrained to rotate in sliding contact with the first clamping surface 46, because eccentricity between the first and second clamping surfaces 46 and 74, which could inhibit rotational sliding movement of those surfaces, will not inhibit axial sliding movement of those surfaces. Moreover, the clamping member 18 will securely remain in its clamping position because it will not be urged to rotate out of its clamping position by torsional forces which act on and urge the sleeve 24 and the tie rod 16 to rotate relative to each other.

Figure 4:
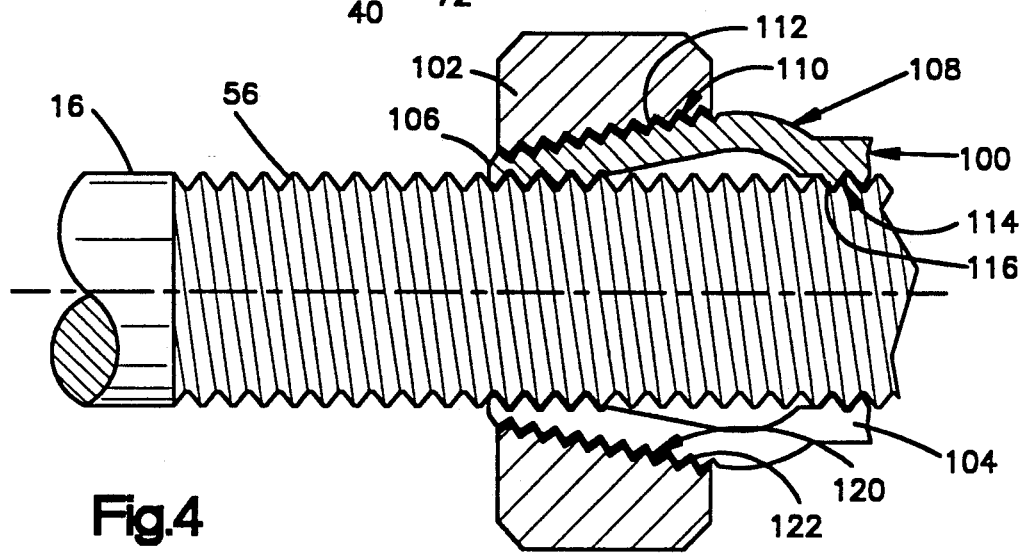
FIG. 4 is a partial sectional view of a portion of a joint constructed in accordance with an alternate embodiment of the invention.

As shown in FIG. 4, an alternate embodiment of the invention comprises a sleeve 100 and a clamping member 102 which are preferably formed of the same materials as the sleeve 24 and the clamping member 18 described above, but which differ in shape from the sleeve 24 and the clamping member 18. The sleeve 100 is also formed from a metal blank which is shaped in a stamping process, and has a longitudinal seam which is defined in part by an edge surface 104. The sleeve 100 has an annular end surface 106, and a clamping portion 108 which extends axially inward and radially outward from the end surface 106. The clamping portion 108 has a frusto-conical outer clamping surface 110 with a tapered external thread 112. The sleeve 100 also has an inner surface 114 with an internal thread 116 which is interrupted at the clamping portion 108.

The clamping member 102 is an annular member having a frusto-conical inner clamping surface 120 with a tapered internal thread 122. Like the clamping member 18 described above, the clamping member 102 is not threaded on the tie rod 16. When the clamping member 102 is advanced axially onto the clamping portion 108 of the sleeve 100, with the internal thread 122 on the clamping member 102 engaged with the external thread 112 on the sleeve 100, a clamping force is developed between the inner and outer clamping surfaces 120 and 110. The sleeve 100 is thus clamped against the tie rod 16.

Figure 5:
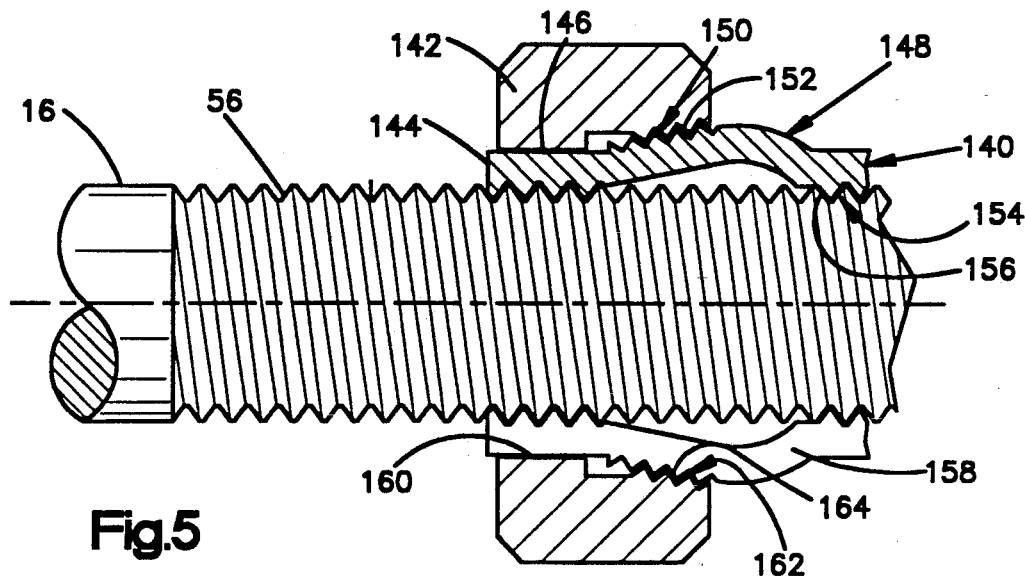
FIG. 5 is a partial sectional view of a portion of a joint constructed in accordance with another alternate embodiment of the invention.

As shown in FIG. 5, another alternate embodiment of the invention comprises a sleeve 140 and a clamping member 142 which clamps the tie rod 16 in the sleeve 140. The sleeve 140 and the clamping member 142 are also preferably formed of the same materials as the sleeve 24 and the clamping member 18 described above. The sleeve 140 has an annular end surface 144, a cylindrical outer surface 146, and an enlarged clamping portion 148 which is spaced axially from the annular end surface 144 by the cylindrical outer surface 146. The clamping portion 148 has a frusto-conical outer clamping surface 150 with a tapered external thread 152. The sleeve 140 also has an inner surface 154 with an internal thread 156 which is interrupted at the clamping portion 148, and has a longitudinal seam which is defined in part by an edge surface 158.

The clamping member 142 is an annular member having a first inner surface 160 extending axially from a first open end of the clamping member 142, and having a second inner surface 162 extending axially from a second open end of the clamping member 142. The first inner surface 160 is a cylindrical inner surface receivable coaxially over the cylindrical outer surface 146 on the sleeve 140, as shown in FIG. 5. The second inner surface 162 of the clamping member 142 is a frusto-conical inner clamping surface having a tapered thread 164. Like the clamping members 18 and 102 described above, the clamping member 142 is not threaded on the tie rod 16. When the clamping member 142 is advanced axially onto the sleeve 140, with the internal thread 164 engaged with the external thread 152, a clamping force is developed between the inner clamping surface 162 and the outer clamping surface 150. The tie rod 16 is thus clamped in the sleeve 140.

From the above description of the invention, those skilled in the art will perceive improvements, changes and modifications. Such improvements, changes and modifications within the skill of the art are intended to be covered by the appended claims.

Having described the invention, the following is claimed:

1. A joint for connecting a rod member in a vehicle steering linkage to another member in the vehicle steering linkage, the rod member having a screw threaded portion, said joint comprising:

a housing including a socket and a sleeve extending from said socket along an axis, said sleeve having an opening for insertion of the rod member, an internal screw thread engageable with the screw thread on the rod member, an external screw thread, and an external clamping surface;

a ball stud having a ball end and a shank, said ball end being located in said socket, said shank having means for connecting said ball stud to the other member in the vehicle steering linkage; and a clamping member having an internal screw thread and an internal clamping surface, said clamping member being rotatable on said sleeve with said internal screw thread on said clamping member engaged with said external screw thread on said sleeve, said internal clamping surface being rotatable in sliding contact with said external clamping surface upon rotation of said clamping member on said sleeve to force said internal clamping surface axially against said external clamping surface;

each of said clamping surfaces being inclined with respect to said axis;

said external screw thread on said sleeve being a tapered screw thread on said external clamping surface, said internal screw thread on said clamping member being a tapered screw thread on said internal clamping surface;

said sleeve comprising a portion of a metal blank rolled into a tubular shape with an axially extending seam defined by adjoining edge surfaces of said metal blank, said external clamping surface being a frusto-conical surface extending circumferentially from one of said edge surfaces to the other of said edge surfaces;

said sleeve having an open end in which the rod member is insertable, and having a circumferentially extending unthreaded external surface located axially between said open end and said tapered screw thread on said external clamping surface.

2. A joint as defined in claim 1 wherein said clamping member has a first open end, a second open end, and a cylindrical internal surface extending axially from said first open end, said cylindrical internal surface on said clamping member being receivable coaxially over said unthreaded external surface on said sleeve, said internal clamping surface extending axially from said second open end of said clamping member.

3. Apparatus for engaging a rod member in a vehicle steering linkage, the rod member having a screw threaded portion, said apparatus comprising:

a sleeve extending along an axis, said sleeve having an opening for insertion of the rod member, an internal screw thread engageable with the screw thread on the rod member, an external screw thread, and an external clamping surface which is inclined with respect to said axis; and clamping means for clamping the screw threaded portion of the rod member in said sleeve, said clamping means including a clamping member which is free of a screw thread for engaging the screw thread on the rod member, said clamping member having an internal screw thread and an internal clamping surface, said internal clamping surface being inclined with respect to said axis;

said clamping member being movable axially on said sleeve upon rotation of said clamping member on said sleeve with said internal screw thread on said clamping member engaged with said external screw thread on said sleeve, said internal clamping surface being movable forcibly in rotational and axial sliding contact with said external clamping surface upon rotation of said clamping member on said sleeve to develop a clamping force between said clamping surfaces as said clamping member is rotated on said sleeve.

4. Apparatus as defined in claim 3 wherein said external screw thread on said sleeve is a tapered screw thread on said external clamping surface, said internal screw thread on said clamping member being a tapered screw thread on said internal clamping surface.

5. Apparatus as defined in claim 4 wherein said sleeve comprises a portion of a metal blank rolled into a tubular shape with an axially extending seam defined by adjoining edge surfaces of said metal blank, said external clamping surface being a frusto-conical surface extending circumferentially from one of said edge surfaces to the other of said edge surfaces.

6. Apparatus comprising:

a sleeve extending along an axis, said sleeve having an opening, an internal screw thread, and a first clamping surface which is inclined with respect to said axis;

a rod member extending through said opening and into said sleeve, said rod member having a screw thread engaged with said internal screw thread in said sleeve;

clamping means including an annular clamping member received over said sleeve, said clamping member being free of a screw thread for engaging said screw thread on said rod member and having a second clamping surface which is inclined with respect to said axis, said clamping member being rotatable on said sleeve and being movable axially relative to said sleeve and said rod member both with and without simultaneous rotational movement on said sleeve; and moving means for moving said second clamping surface on said clamping member forcibly against said first clamping surface on said sleeve to develop a clamping force between said clamping surfaces, said moving means including a nut having an internal screw thread, said nut being movable axially on said rod member upon rotation of said nut on said rod member with said internal screw thread on said nut engaged with said screw thread on said rod member, said nut being rotatable on said rod member relative to said clamping member in sliding contact with said clamping member and being movable simultaneously against said clamping member axially to force said second clamping surface against said first clamping surface upon rotation of said nut on said rod member.

7. Apparatus as defined in claim 6 wherein said sleeve is a portion of a housing comprising a socket, said apparatus further comprising a ball stud having a ball end and a shank, said ball end being located in said socket, said shank having means for connecting said ball stud to a part of a vehicle steering linkage.

8. Apparatus as defined in claim 6 wherein said clamping member is an unthreaded ring having a first open end, a second open end, and a cylindrical internal surface extending axially from said first open end, said second clamping surface being a frusto-conical internal surface of said ring extending axially from said second open end.

9. Apparatus as defined in claim 8 wherein said sleeve has a cylindrical external surface located axially between said opening and said first clamping surface, said cylindrical internal surface of said clamping member being located coaxially over said cylindrical external surface of said sleeve when said second clamping surface contacts said first clamping surface.

10. Apparatus as defined in claim 9 wherein said sleeve comprises a portion of a metal blank which is rolled into a tubular shape with an axially extending seam defined by adjoining edge surfaces of said metal blank, said first clamping surface being a frusto-conical external surface of said sleeve extending circumferentially from one of said edge surfaces to the other of said edge surfaces.

* * * * *